Oct. 19, 1965     J. L. HIGGINS ETAL     3,212,474
ANIMAL HOUSING STRUCTURE
Filed July 9, 1963     2 Sheets-Sheet 1
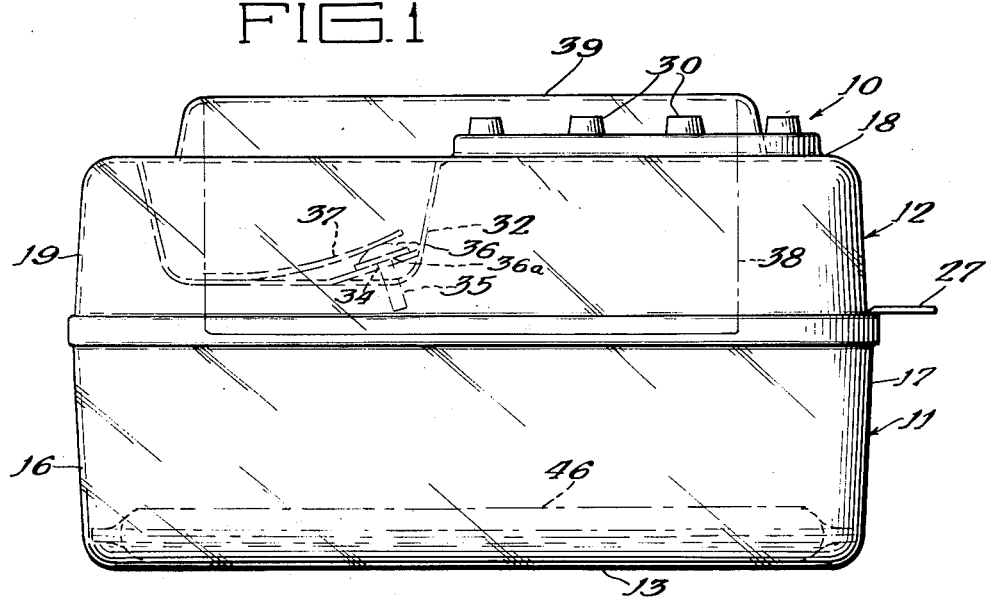
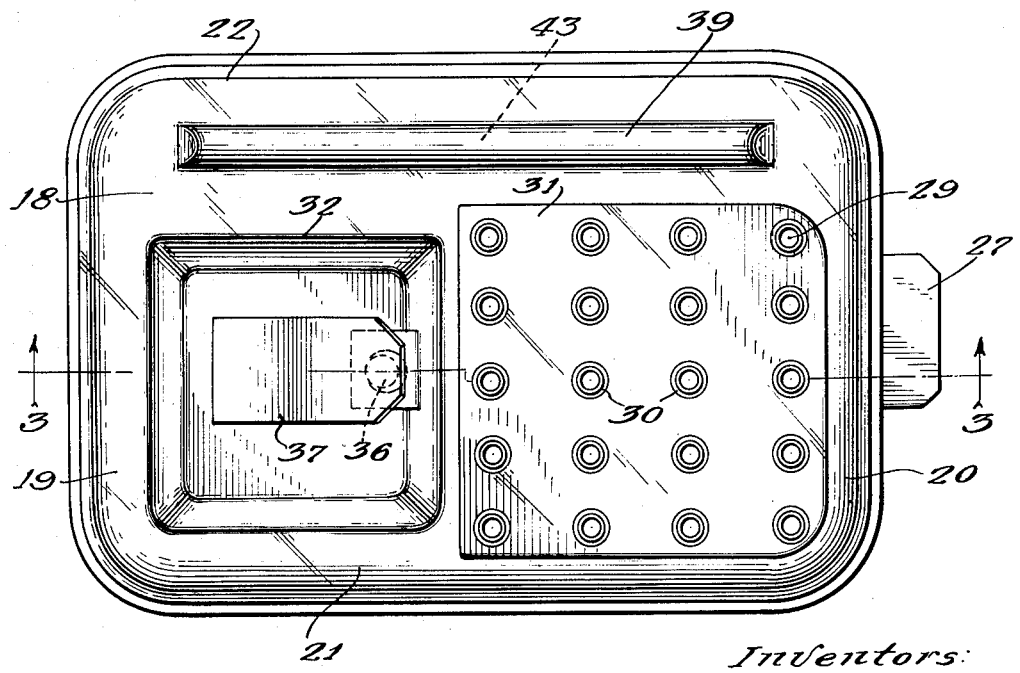
Inventors:
John L. Higgins
William F. McFetridge
Julian M. Hanna
By: Hofgren, Wegner, Allen,
Stellman & McCord
Attorneys Oct. 19, 1965
J. L. HIGGINS ETAL
3,212,474
ANIMAL HOUSING STRUCTURE
Filed July 9, 1963
2 Sheets-Sheet 2
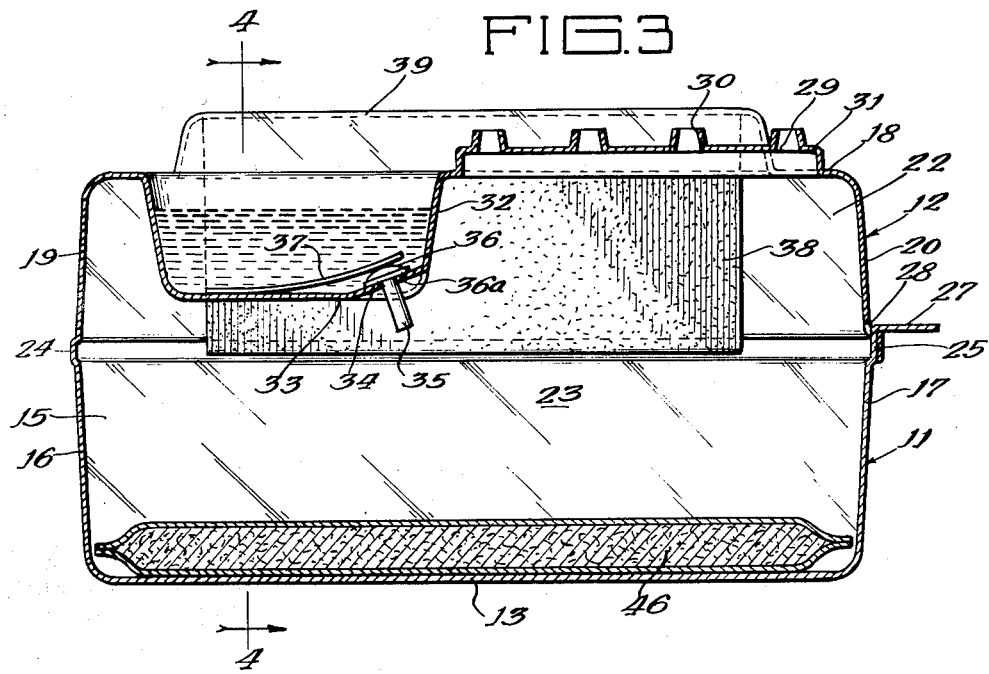
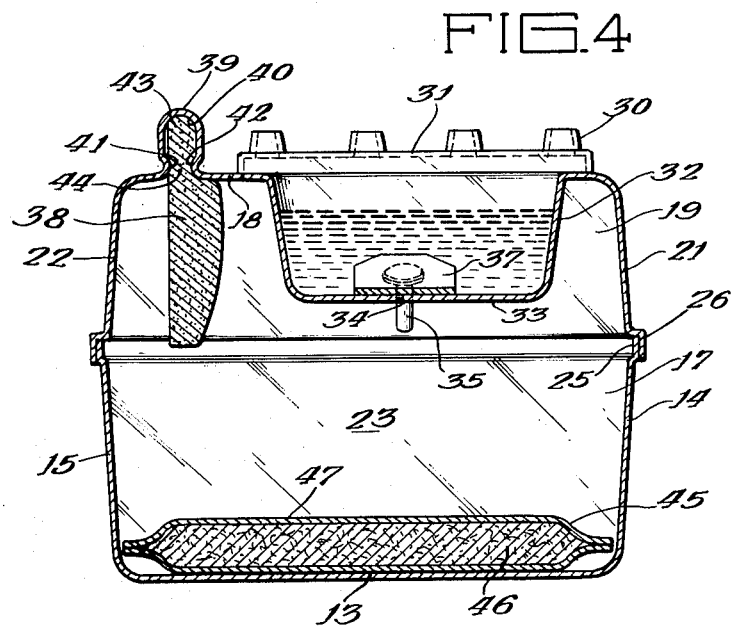

3,212,474
ANIMAL HOUSING STRUCTURE
John L. Higgins, Daytona Beach, William F. McFetridge, Ormond Beach, and Julian M. Hanna, De Land, Fla., assignors to Roehr Products Company, Inc., a corporation of Delaware
Filed July 9, 1963, Ser. No. 293,627
6 Claims. (Cl. 119—18)

This invention relates to housing structures and in particular to structures for housing animals such as laboratory animals.

There has long been a need for a simple disposable housing structure such as for use in housing laboratory animals. The conventional known housing structures have the serious disadvantage of difficulty of maintenance. Further, the known housing structures are relatively wasteful of space and relatively costly. Still further, the known housing structures require relatively complicated water and food delivery means and do not satisfactorily provide the required high degree of cleanliness in the water and food.

The present invention comprehends an improved animal housing structure eliminating the above disadvantages of the known structures in a simple and economical manner. Thus, a principal feature of the present invention is the provision of a new and improved animal housing structure.

Another feature of the invention is the provision of such an animal housing structure including means including a bottom wall, side walls, and a top wall defining a housing chamber, means in the wall means defining an air opening, means carried by the wall means for supplying water to an animal in the chamber, and means on the wall means for carrying a food block above the bottom thereof to project therefrom into the chamber.

A further feature of the invention is the provision of such an animal housing structure wherein the wall means is formed of a substantially imperforate material and includes integrally joined bottom, side, and top walls.

Still another feature of the invention is the provision of such an animal housing structure wherein the wall means defines air openings each of which has all portions thereof confronting the housing chamber rounded.

Still another feature of the invention is the provision of such an animal housing structure wherein the water supply means comprises a recessed portion in the top wall and includes means for controlled delivery of the water through the top wall upon demand by the animal in the housing chamber.

A yet further feature of the invention is the provision of such an animal housing structure wherein the food carrying means comprises an embossment on said wall means defining a pair of opposed shoulders for engaging the food block to suspend it above the bottom wall.

Other features and advantages of the invention will be apparent from the following description taken in connection with the accompanying drawings wherein:

FIGURE 1 is a side elevation of an animal housing structure embodying the invention;

FIGURE 2 is a top plan view thereof;

FIGURE 3 is a longitudinal vertical section thereof taken along the line 3—3 of FIGURE 2; and FIGURE 4 is a transverse vertical section thereof taken substantially along the line 4—4 of FIGURE 3.

In the exemplary embodiment of the invention as disclosed in the drawing, an animal housing structure generally designated 10 is shown to comprise a complementary lower housing portion 11 and a complementary upper housing portion 12. Lower housing portion 11 includes a bottom wall 13, a left side wall 14, a right side wall 15, a rear wall 16, and a front wall 17. The upper housing portion 12 includes a top wall 18, a rear wall 19, a front wall 20, a left side wall 21, and a right side wall 22. Thus, as shown in FIGURES 3 and 4, the housing portions 11 and 12 cooperatively define a chamber 23 for housing laboratory animals, such as mice and the like.

The housing portions 11 and 12 may be integrally joined by a hinge portion 24 interconnecting the rear walls 16 and 19. Further, the upper edge of the walls 14, 15 and 17 is defined by an upstanding peripheral flange 25 adapted to nest within a depending peripheral flange 26 at the lower edge of the walls 19, 20 and 22 of the upper housing portion 12. The housing portions may be releasably secured in the closed position of FIGURE 1 by means of a tab 27 extending forwardly from the flange 25 to project through an opening 28 in the front wall 20 of the upper housing portion. The housing portions 11 and 12 may be formed as by molding from a suitable plastic. Thus, the housing portions may be molded in a configuration with each of the portions opening upwardly in side-by-side relationship, the upper portion then being hingedly moved about connecting portion 24 to the enclosure arrangement of FIGURE 1. The arrangement of the housing structures in the enclosure forming configuration of FIGURE 1, however, may be delayed until it is desired to utilize the structure for housing animals. Thus, the structures may be shipped and stored in the open arrangement whereby a plurality of the housing structures may be nested one within the other, thereby reducing space requirements.

The walls of the housing structure may be made relatively thin so that the structure is quite inexpensive, and, thus, is economically "disposable." More specifically, the cost of replacing the entire housing structure is substantially less than the cost of suitably cleaning the conventional cage structures for housing such laboratory animals. It has been found that a typical housing structure such as housing 10 having dimensions roughly 5 inches wide by 8 inches deep by 4½ inches high is adapted for housing laboratory animals such as mice with a 20 animal day rating before requiring replacement of the housing structure (e.g. 5 animals may be kept therein for 4 days).

To preclude undesirable gnawing of the housing structure material, all of the inwardly facing corners and edges of the housing structure are rounded. Further, the upper edge of the flange 25 is protected within the offset flange 26 of the upper housing portion so as to preclude gnawing by the animals within the cage.

Air is provided to the housing chamber 23 through a plurality of air openings 29 in the top wall 18. As best seen in FIGURE 3, each air opening is defined by an upstanding frusto-conical boss 30 narrowing upwardly and rounded downwardly into the top wall 18. The openings 29 may be provided in a raised wall portion 31 of the top wall 18.

A water supply provided for watering the animals within the chamber 23 is herein defined by a depressed or dished portion 32 of the top wall 18 forming an upwardly opening reservoir. The bottom wall 33 of the reservoir 32 is provided with an opening 34 through which a sipper element 35 extends. A valve 36 including a sealing washer 36a is carried at the upper end of the element 35 and is normally urged into sealingly engagement with the bottom wall 33 by a resilient finger 37 fixed at one end to the bottom wall 33. Thus, when an animal within chamber 23 urges the element 35 upwardly against the action of the finger 37, water runs out from the reservoir 32 through the opening 34 for use by the animal. Thus, valve 36 is operated as a demand valve by the animals themselves within the chamber 23 for controlled delivery of the water from the reservoir for drinking purposes. As the reservoir 32 is readily accessible from the exterior of the housing, it may be readily filled subsequent to the placement of the animals within the housing structure simply by pouring water thereinto once the upper housing portion 12 is disposed in the horizontal position of FIGURE 1. Additional water may be delivered into the reservoir 32 subsequently as required.

The top wall 18 further defines means for suspending a food block 38 therefrom for feeding the animals within the chamber 23. Thus, as best seen in FIGURE 4, the top wall includes an upstanding boss 39 defining an upper space 40 and a pair of opposed shoulders 41 and 42 at the level of the flat plane of the top wall 18 and having a spacing therebetween less than the corresponding transverse dimension of the space 40. The boss 39 is elongated, as best seen in FIGURES 1, 2 and 3, the food block 38 is similarly elongated and provided with an upper portion 43 adapted to be retained in space 40 and having a reduced portion 44 adapted to be retained between shoulders 41 and 42 to secure the food block in the suspended arrangement of FIGURE 4. The plastic material of which the top wall 18 is formed is preferably somewhat resiliently yieldable to permit the food block to be installed simply by urging the upper portion 43 through the space between shoulders 41 and 42 until the reduced portion 44 is engaged by the shoulders. The food block is thusly retained clean and dry above the lower portion of the cage, thereby providing improved cleanliness in the feeding of the animals therein. The food block is formed of suitable food material, such as cereal and the like, compressed suitably to maintain the block, or brick, configuration while permitting the animals to slowly eat away the material in the feeding process.

A mattress, or bedding package, 45 may be provided in the lower portion of the chamber 23 on bottom wall 13 for bedding purposes of animals in the structure. The package may be formed of suitable straw or other bedding material 46 enclosed in a light paper envelope 47. The package 45 thusly may be readily sterilized prior to use while yet may be readily opened by the animals and the bedding material therein utilized as loose material in the conventional manner.

The animals may be readily inserted and withdrawn from the lower housing portion 11 when the upper portion 12 is removed from the closed position of FIGURE 1. Thus, the animals may be quickly transferred from one housing structure 10 to another when it is desired to dispose of the first housing structure. The food block 38 may be preselected in size to provide sufficient food for the period of time in which the animals are to be kept in the structure, and, thus, the entire structure may be disposed of at minimum cost.

As the lower housing portion 11 receives the litter and refuse, it may be unnecessary in certain instances to dispose of the upper portion of the structure in providing a new housing structure to which the animals may be transferred. Thus, the connecting portion 24 may be made separable so that the upper portion 12 of the structure in use may be removed and installed on a new lower portion 11 to which the animals may be transferred. Thus, further economies may be effected in the use of the invention.

As the bottom wall 13 is imperforate, a plurality of housing structures 10 may be stacked one on top of the other without contamination of the subjacent ones by the superjacent ones. Thus, notwithstanding the fact that the reservoir 32 is upwardly open, the water therein is maintained clean at all times and little is effectively precluded from passing downwardly through the air holes 29 from a superposed structure.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. An animal housing structure, comprising: means including a bottom wall, side walls, and a top wall defining a housing chamber; said top wall defining (a) a plurality of air openings, (b) a water supply basin for containing water and provided with a passage through said top wall for conducting water from said basin to said chamber, and (c) means for carrying a food block to depend therefrom in said chamber.

2. An animal housing structure, comprising: means including a bottom wall, side walls, and a top wall defining a housing chamber; said top wall defining (a) a water supply basin, (b) means for conducting water from said basin to said chamber, and (c) means carried on said top wall for controlling flow of water through said conducting means for delivery only on demand by an animal in said chamber.

3. The animal housing structure of claim 2 wherein said water supply basin comprises a downwardly dished portion of said top wall.

4. The animal housing structure of claim 2 wherein said water conducting means comprises a passage through said top wall and said flow controlling means comprises a valve selectively closing said passage and means fixed to said top wall and biasing the valve closed.

5. The animal housing structure of claim 2 wherein said water conducting means comprises a passage through said top wall and said flow controlling means comprises a valve selectively closing said passage and means biasing the valve closed, and a valve operator extending downwardly from said passage into said chamber.

6. The animal housing structure of claim 1 including means fixed with the top wall for controlling the flow of water through said passage.

References Cited by the Examiner

UNITED STATES PATENTS

| 2,467,525 | 4/49 | Fricke | 119—18 X |
| 2,709,985 | 6/55 | Clauson | 119—18 |
| 2,726,636 | 12/55 | Frederiksen | 119—72.5 |
| 2,773,473 | 12/56 | Martin | 119—18 |
| 2,852,054 | 9/58 | Motley | 150—.5 |
| 3,002,492 | 10/61 | Naturale | 119—18 |
| 3,043,354 | 7/62 | Fitzerald | 150—.5 |
| 3,106,801 | 10/63 | Risacher. | |
| 3,122,127 | 2/64 | Schechmeister et al. | 119—18 |

FOREIGN PATENTS

| 1,266,373 | 5/61 | France. |

SAMUEL KOREN, Primary Examiner.

HUGH R. CHAMBLEE, Examiner.